United States Patent [19]

Karubian et al.

[11] 4,446,598
[45] May 8, 1984

[54] STUNNING GUN

[75] Inventors: Ralph Karubian, Los Angeles, Calif.; Robert G. Breukelman; Lynn R. Weston, both of Huron, S. Dak.

[73] Assignee: Kentmaster Mfg. Co., Inc., Los Angeles, Calif.

[21] Appl. No.: 517,003

[22] Filed: Jul. 25, 1983

[51] Int. Cl.³ ............................................. A22B 3/02
[52] U.S. Cl. .................................................. 17/1 B
[58] Field of Search ................................ 17/1 B, 1 R

[56] References Cited

U.S. PATENT DOCUMENTS

| 910,775 | 1/1909 | Bergh | 17/1 B |
| 3,067,454 | 12/1962 | Catlin et al. | 17/1 B |
| 4,219,905 | 9/1980 | Thacker et al. | 17/1 B |

FOREIGN PATENT DOCUMENTS 287047  5/1928  United Kingdom ................. 17/1 B Primary Examiner—Willie G. Abercrombie
Attorney, Agent, or Firm—Bruce L. Birchard

[57] ABSTRACT

By increasing the mass and reducing the surface friction of the piston driving a penetrating bolt in an animal stunning gun and providing that bolt with a conically-shaped recess at its tip, maximum penetrating force with minimum gun complexity is achieved. The control valve releases the piston driving fluid, e.g. compressed air, very rapidly for the maximum surge effect on the piston driving the bolt. Further simplification of the gun without the sacrifice of any performance is achieved by utilizing magnetic or mechanical retention means for the bolt prior to the firing of the gun.

1 Claim, 4 Drawing Figures

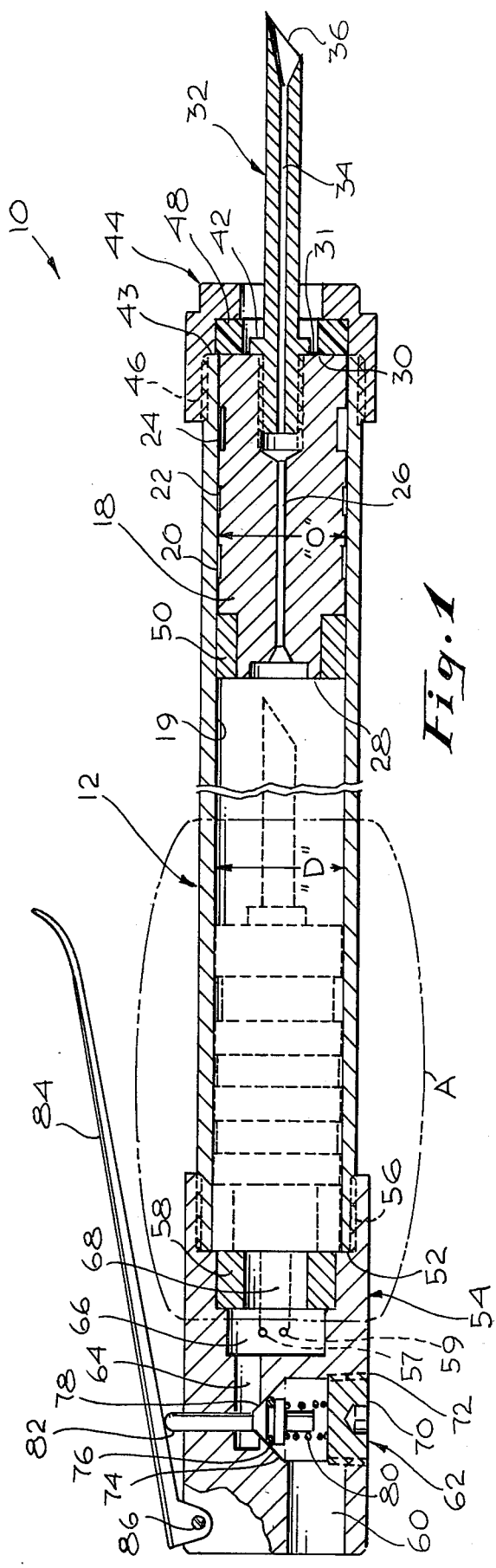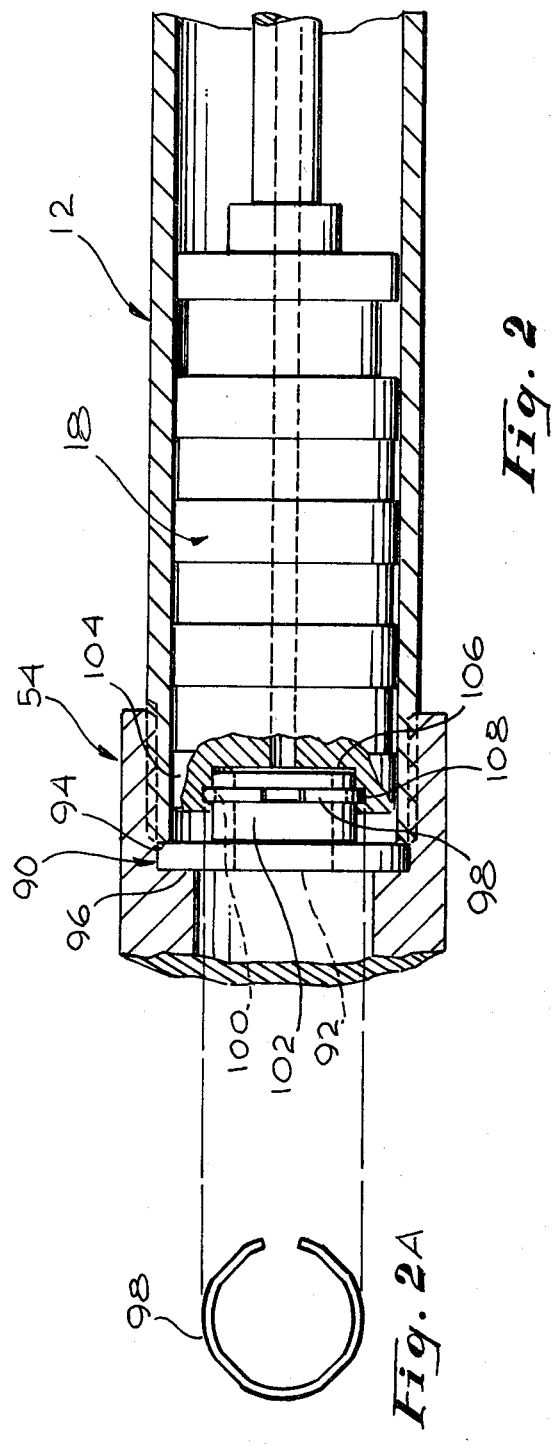

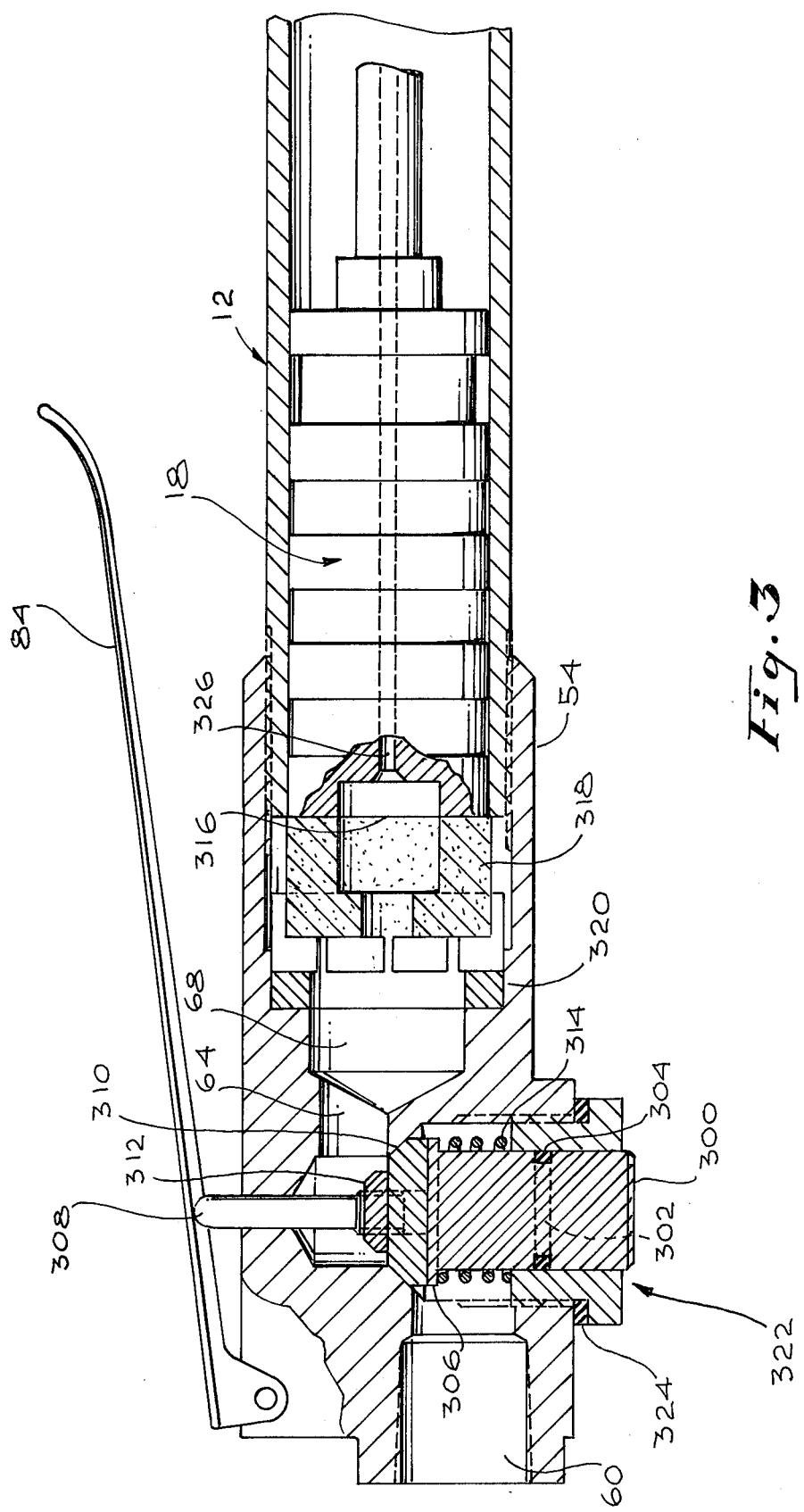

STUNNING GUN

BACKGROUND OF THE INVENTION

1. Field of the Invention

This invention relates to animal-stunning tools for use in slaughter houses.

2. Prior Art

Slaughter house techniques have varied over the ages from the crudeness of a sledge-hammer to the sophistication of electrical-shock equipment. The object of all of this equipment is to cause unconciousness in the animal during slaughter but not causing the cessation of the pumping action of the heart. The flow of blood through the animal is important to the quality of the meat obtained from the animal.

A search of the Patent Office records has revealed U.S. Pat. No. 4,219,905 (Thacker) which is related to but not anticipative of my invention. In the Thacker patent a piston of low mass and carrying a low-mass needle is moved forward by a blast of compressed air released through a complex combination of valves. Because of the low mass of the piston and needle, the penetrating power of the combination is limited. The combination of valves incorporated in Thacker is expensive, complex, and subject to malfunctioning. Further, the O-rings and seals in Thacker's device cause friction during operation of the piston and are also subject to wear and failure under the air pressure which must be used.

Therefore, it is the general object of this invention to provide an animal stunning gun which is free from the problems associated with prior art devices.

It is a further object of this invention to provide a low-cost, highly effective stunning gun with minimal operational problems.

SUMMARY OF THE INVENTION

By providing a relatively massive cylindrical piston with annular recesses in its outer surface, such piston having a diameter such that it forms a slip fit with its containing cylinder so as to eliminate O-rings with their friction, the penetrating bolt carried by said piston having a conically-concave tip, retention of said piston and bolt in the retracted state being by magnetic means or alternatively, spring means, a compressed-air stunning gun with maximum simplicity and effectiveness is realized.

BRIEF DESCRIPTION OF THE DRAWINGS

Those and other features of my invention will be understood from the description which follows taken in connection with the accompanying drawings in which:

FIG. 1 is a cross-sectional view of an animal stunning gun according to this invention;

FIG. 2 is an enlarged, sectional, scale view of portion "A" of the device of FIG. 1, with an alternative piston-retention mechanism; and FIG. 2A is an elevational view of an element of the mechanism of FIG. 2; and FIG. 3 is a cross-sectional view of an alternative embodiment of the air-control section of the stunning gun of FIG. 1.

DETAILED DESCRIPTION OF THE PREFERRED EMBODIMENT

In FIG. 1, stunning gun 10 includes cylindrical, hollow barrel 12 having an inside-diameter "D". A cylindrical piston 18, of stainless steel, conventional steel or other material, having an outer-diameter "O" such that a slip-fit exists between piston 18 and the inner wall 19 of diameter "D" in barrel 12, is designed to move within barrel 12 without releasing air around its outer extremity. Piston 18 has annular recesses 20, 22 and 24 which reduce surface friction between inner wall 19 and piston 18 without significantly reducing the mass of piston 18. A coaxial air passage 26 extends from end 28 of piston 18 to opposite end 30 thereof. The air passage 26 is enlarged at end 30 and internally threaded to permit insertion and retention of bolt or probe 32 therein. Probe 32 has an air passage 34 coaxially therethrough aligned with air passage 26 in piston 18. Annular stop 42 is provided on probe 32 to firmly seat probe 32 in piston 18. Piston 18 and probe 32 may be made of stainless steel to minimize corrosion and contamination. Probe 32, which must be very hard and cannot be made of stainless steel, terminates at its exposed end 36 in a concavity of conical shape. This concentrates penetrating forces in a sharp edge on end 36, enhancing the penetrating powers of probe 32. Air in front of piston 18 as it moves probe 32 into the animal's skull is exhausted through port 31.

Barrel 12 is closed at one end 43 by cap 44 which may be held onto barrel 12 by internal threads 46. A rubber or other shock-absorbing cushion 48, or a coil spring, is held in cap 44. A ring of magnetic material or a ceramic magnet, itself, 50 is secured in piston 18 near end 28.

The opposite end 52 of barrel 12 carries handle 54 by means of threads 56, for example.

Handle 54 contains therein retaining ring magnet 58 polarized to attract and cooperate with ring 50, assuming ring 50 is a magnet. Handle 54 further contains compressed air inlet aperture 60 which selectively communicates through valve assembly 62 with intermediate chamber 64, outlet chamber 66 and the central opening 68 in ring magnet 58 to permit the controlled flow of air therethrough to end 28 of piston 18. Valve assembly 62 includes plug 70 which is secured in handle 54 by means of a threaded region 72. Spool 74 carrying "O"-ring 76 is held captive by plug 70, on one extremity and by shoulder 78 in handle 54 on the opposite extremity. "O"-ring 76 presses against shoulders 78 and forms an air-tight seal therewith under urging from spring 80. Actuating arm 82 on spool 74 extends beyond the surface of handle 54 to permit its actuation by trigger 84 which is pivotally supported at pivot 86 in handle 54.

Upon depression of trigger 84, with piston 18 in a retracted position, compressed air introduced at inlet aperture 60 passes, with an initial high-energy surge, through valve assembly 62, intermediate chamber 64 and outlet chamber 66 and through opening 68 in ring magnet 58 to impress itself on end 28 of piston 18. The construction of valve assembly 62 provides for rapid opening of the air passage therethrough. When the retaining force between magnet 58 and magnetic material or ring magnet 50 is overcome, piston 18, with its considerable mass, is accelerated by the compressed air and attains considerable forward momentum. Probe 32 moves forward and, with cap 44 resting on or adjacent to an animal's head, probe 32 penetrates the skull and enters the brain. Compressed air is injected into the brain cavity and into the brain of the animal through causing the animal to become unconscious or comatose. The probe 32 is removed from the animal's skull by pulling back on handle 62. The rebound action produced by the coil or cushion 48 assists the removal of the probe 32 from the skull. The gun is then re-cocked by holding it with probe 32 upright, causing probe 32 to retract into a position with magnetic material 50 in contact with ring magnet 58.

It should be noted that magnet 58 may be an electromagnet, as is indicated by leads 57, 59 in FIG. 1. The flux field of magnet 58 is made such that ring 50 and piston 18 are retained in the retracted position until the pressure on piston 18 becomes high so that piston 18 is released in impulse fashion and achieves its operating speed rapidly. Further, the length of barrel 12 is made longer than the combined lengths of piston 18 and the exposed protion of probe 32 so that the combination of piston and probe will achieve a significant forward momentum before probe or bolt 32 strikes the skull of the animal being stunned.

An alternative piston-retention structure is shown in FIG. 2. In FIG. 2, retaining member 90, having a coaxial opening 92 therethrough, is held between the end 94 of barrel 12 and the inner face 96 of handle 54, with the axes of retaining member 90 and barrel 12 aligned. A retaining ring 98 of spring-like material is held, by its own resilient forces, in a groove 100 in shoulder 102 of retaining member 90. Element 104 of piston 18 has a recess 106 therein sized and positioned to receive shoulder 102 of retaining means 90. In the wall formed in element 104 by recess 106 there is a groove 108 sized to receive retaining spring 98 when piston 18 is in its fully retracted position. Spring 98 contracts under force from the inner wall of element 104 in piston 18 and snaps into an expanded position when it engages groove 108. Thus, piston 18 is retained in a retracted position until a surge of compressed air hits the face of element 104 upon the opening of valve assembly 62 (FIG. 1). Piston 18 then accelerates rapidly, as was described in connection with the discussion of the apparatus of FIG. 1.

In FIG. 3, the air-valving system for actuating piston 18 has been modified with respect to the system in FIG. 1 to reduce back-pressure on the valve. The opening of the valving system in FIG. 3 is more positive and results in a greater surge of air and greater acceleration of piston 18 than is accomplished in the valving system of FIG. 1. Spool 300 has annular ring 302 for receiving "O"-ring 304. Spool 300 also has an integral shoulder 306 and an integral actuating arm 308. The air-valving washer 310 is held against shoulder 306 by nut 312. When trigger 84 is depressed restoring spring 314 is compressed and air moves rapidly and in great volume from air inlet passage 60 through intermediate chamber 64 and central opening 68 onto the face 316 of piston 18 to accelerate piston 18. A ring magnet 318 retains piston 18 in a withdrawn position until trigger 84 is actuated and the pneumatic force on face 316 exceeds the magnetic force between ring magnet 318 and face 316 of piston 18. Magnet 318 is supported in handle 54 by means of retainer 320. Air leakage at the joint between valve assembly 322 and handle 54 is prevented by "O"-ring 324. An air passage 326 is provided through piston 18 as before, to assist in the stunning of the animal.

Thus, it can be seen that there has been provided a stunning gun which is simple in construction, subject to little failure in operation and effective in its performance.

While particular embodiments have been shown and described, it will be apparent to one skilled in the art that variations and modifications thereof may be made without departing from the spirit and scope of my invention. It is the purpose of the appended claims to cover all such variations and modifications.

I claim:

1. A stunning gun having:
    a barrel with an inner wall having a first inside diameter and with first and second ends;
    a piston having a first maximum outside diameter supported coaxially within said barrel for movement therein;
    said first maximum outside diameter having a magnitude such that said piston forms a slip fit with said first inside diameter of said inner wall of said barrel;
    a probe fixedly and coaxially supported at the end of said piston corresponding to said second end of said barrel and moveable with said piston;
    said piston and said probe each having intercommunicating air passages therethrough;
    said air passage in said probe having a coaxial portion and a communicating exhaust portion at right angles thereto;
    said piston having annular recesses in the outer surface thereof and carrying on its end corresponding to said first end of said barrel a region of magnetic material;
    a handle portion carried by said barrel at said first end thereof and having an air inlet aperture and intermediate and outlet chambers therein,
    said intermediate chamber and said outlet chamber being intercoupled for air passage therethrough;
    said outlet chamber being coupled, for air passage, to said barrel;
    a valve assembly carried in said handle and interposed between said air inlet aperture and said intermediate chamber for control of air flow between said inlet aperture and said intermediate chamber and, consequently, for control of air into said barrel;
    piston-retaining means carried within said handle adjacent said first end of said barrel for releasably retaining said piston in a position adjacent said first end of said barrel prior to the firing of said gun, said retaining means comprises a spring member carried in said handle portion, said piston having a recess in its end corresponding to said first end of said barrel, said recess having an inner groove therein, said inner groove being adapted to receive said spring member carried in said handle for retaining said piston in a retracted position;
    said inlet aperture being adapted for coupling to a source of compressed air; and,
    a trigger carried by said handle and positioned to engage and actuate said valve assembly for permitting the passage of compressed air from said inlet aperture to said piston to cause motion of said piston and the probe carried thereby.

* * * * *